United States Patent Office 3,766,124
Patented Oct. 16, 1973

3,766,124
PROCESS FOR MODULATING THE CURING EXOTHERM OF THERMOSETTING HIGH-VINYL POLYBUTADIENE
Dale A. Tompkins, Akron, Ohio, assignor to The Firestone Tire & Rubber Company, Akron, Ohio
No Drawing. Filed May 20, 1971, Ser. No. 145,566
Int. Cl. C08c *11/22;* C08d *1/20*
U.S. Cl. 260—33.6 AQ                    12 Claims

ABSTRACT OF THE DISCLOSURE

The process disclosed herein comprises the curing of a thermosetting high-vinyl polybutadiene polymer while in intimate admixture with 1–30% of a hydrocarbon oil having a substantial portion of aliphatic hydrocarbon therein. It is found that such thermosetting polymers when cured with free radical generating catalysts such as peroxy compounds will generate an exotherm which very often causes crazing, cracking and bubble formation in the casting. The larger the casting the more likelihood there is for such defects to occur. The presence of the oil during the curing modulates the exotherm to a lower temperature, thereby reducing the possibilities for formation of cracks, crazing and bubble formation that generally otherwise occur. This makes it possible to make a pourable resin composition as an encapsulating material that can be cured in substantial volume without the formation of cracks, crazing and bubbles.

BACKGROUND OF THE INVENTION

Field of the invention

This invention relates to thermosetting high-vinyl polybutadiene. More specifically, it relates to the curing of such thermosetting resins which normally in castings of substantial size generate such high exotherms that cracking, crazing and bubble formation result. Still more specifically, it relates to a process for modulating the high exotherm so that castings of substantial size can be made without such defects. Still more specifically, the invention relates to the curing of such thermosetting resins admixed with and in intimate contact with an aliphatic hydrocarbon oil.

Related prior art

In curing, potting or encapsulating compositions it is desirable to have a pourable material so as to surround and fill crevices in the device or article to be encapsulated, such as a piece of electrical equipment. While such material must initially be in a pourable state, it must cure to a hard, rigid thermoset composition free of defects. If the material used in the initial stages is of too low a molecular weight, it may be difficult to cure the resin to a hard, rigid composition. Moreover, if the temperature applied or the temperature generated during the curing causes such heat accumulation that it cannot be rapidly dissipated, the casting may be cracked or crazed, or if gases or vapors are generated during the casting, bubble formation may result.

STATEMENT OF THE INVENTION

In accordance with the present invention, it has been found that the curing of a thermosettable high-vinyl polybutadiene in a substantial volume, which might otherwise craze and crack and form bubbles as a result of the high exotherm generally generated, may be cured in intimate admixture with 1–30%, preferably 5–10% of an aliphatic hydrocarbon oil. The butadiene polymer used in the practice of this invention has at least 80%, preferably at least 90% of the butadiene repeating units therein in the 1,2-configuration, having at least 40%, preferably at least 70% by weight butadiene in the polymer, and having a molecular weight distribution of at least 95% above 2,000 and at least 50%, preferably at least 90% above 10,000, with the average molecular weight being in the range of 12,500–55,000, preferably 14,000–34,000.

The presence of the oil in the thermosetting composition decreases the exotherm temperature, typically from a peak of 355° C. to a peak of 235° C., at which lower peak temperatures there is less cracking, crazing and bubble formation. The aliphatic portion of the hydrocarbon oil is the effective part, and where other materials may be present, the effectiveness of the oil is in proportion roughly to the aliphatic content. The more highly aliphatic oils are preferred, that is those having more than 50%, preferably more than 80% aliphatic hydrocarbons therein. This aliphatic content can be a completely aliphatic hydrocarbon, or can be an aliphatic portion attached to an aromatic portion. While 1% of an aliphatic oil may cause a noticeable increase in moderating the exotherm, generally it is preferable to have at least 5%, and not much further improvement is noted for the amount of oil exceeding 30%. Therefore, it is advantageous to have 1–30%, preferably 5–10% of aliphatic hydrocarbon oil in the composition.

While fillers, such as silica, etc., have been known to dissipate heat somewhat, the oils used in this invention are much more effective. In fact, it is believed that the oil does more than absorb heat. Actually the filler has more heat capacity and should be more effective than the oil if based merely on heat absorption. Therefore even with large amounts of filler, that is 60% or even as high as 85% filler, the presence of the oil has some additional effect in modulating the exotherm.

While applicant does not wish to be committed to such a theory, it is believed to have hydrogen extracted by the peroxide and the resultant hydrocarbon free radical performs the curing with a reduced exotherm. In any case the oil is more effective for this purpose.

The oil used in this invention advantageously has a specific gravity of 0.83 to 0.89, preferably 0.835–0.850, a Saybolt viscosity in seconds (SUS) at 100° F. of 60 to 365, preferably 65–95 at 100° F. (38° C.). Other desirable properties include pour-points of 5–20° F. (—10 to —6° C.), and the boiling point is preferably above 400° F. but can go as low as 225° F. provided a lower curing temperature is used so that the boiling temperature is not exceeded.

The molecular weight of the oil can be as high as 10,000, although it is generally advantageous to have the melting point no higher than the mixing temperature. However the "oil" can be added as particulate matter so long as it is made fluid and uniformly distributed during the mixing.

In the curing or molding operation, temperatures in the range of 225° F. to 400° F. (105° to 205° C.) are advantageously used. Minimum pressure is immaterial but the pressure can be as high as four tons per square inch of projected area.

The "dilute solution viscosity" referred to herein is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration.

Reference to molecular weight herein is intended to mean number average molecular weight. This molecular weight is based on the intrinsic viscosity and is determined according to the procedure described in the 1966 edition of "Polymer Handbook" edited by J. Brandrup and E. H. Immergut and published by Interscience Publishers, New York, pages IV–1 to IV–46, particularly pages IV–29 to IV–31.

The type of high viscosity, high-vinyl butadiene polymer and compositions containing the type of peroxide herein are disclosed and claimed in the co-pending application of S. B. Boutsicaris and R. A. Hayes, Ser. No. 818,971, filed Apr. 24, 1969 and now abandoned.

The butadiene polymers have at least 40%, preferably at least 70% by weight of butadiene in the polymers and have at least 80%, preferably at least 90% by weight of the butadiene therein in the vinyl type of butadiene repeating unit structure. The average molecular weight (determined by intrinsic viscosity measurement) is at least 12,500 and the molecular weight distribution is such that at least 50% and preferably 90% of the polymer has a molecular weight above 10,000 and at least 95% has a molecular weight above 2,000. It has been found that the presence of higher proportions of lower molecular weight polymers than allowed by these limitations causes slow curing rates and poor physical properties in the cured product.

The viscosity of the polymer, the molecular weight distribution and the percent of vinyl repeating units in the polymer are very critical elements in the invention. Properties will vary for a particular average molecular weight depending on the molecular weight distribution. For example, an average molecular weight of 50,000 in one case can comprise a broad molecular weight distribution having molecular weights from 1,000 to 500,000, and in another case a narrow molecular weight distribution ranging from 40,000 to 60,000. The properties of the two can vary considerably even though the two may have the same average molecular weight.

High viscosity and high molecular weight polymers have poor flow, and are much more difficult to compound and to use in molding operations. However, polymers of low viscosity and low molecular weight have slow cure rates and fail to develop suitable physical properties. Suitable polybutadienes have dilute solution viscosity in the range of 0.19 to 0.5, preferably in the range of 0.19 to 0.4, which ranges correspond to molecular weight ranges of 12,500 to 50,000 and 14,000 to 34,000 respectively.

A very important factor in this invention is the fact that the polymer molecular weight distribution should have at least 50% above a molecular weight of 10,000, preferably 90% above 10,000, and at least 95% above a molecular weight of 2,000 (determined by intrinsic viscosity). Greater proportions of low molecular weight polymers htan specified will result in slow cure rates and loss of properties described for this invention.

A convenient means for determining molecular weight distribution is by GPC chromatography which is based on the principle that when a polymer solution is passed through a series of columns containing microporous gels of different pore sizes the polymer is selectively released according to its molecular weight. The higher molecular weight polymer is released more quickly and the lower molecular weight polymer is retained for longer periods in the columns. Thus this continuous means of measuring polymer concentration as the solution comes out of the columns gives a curve which is related to the molecular weight distribution.

By using polymers of known molecular weight and passing a solution of them through the columns and determining the time of retention (counts) for their particular molecular weights, a calibration curve of molecular weight versus counts can be obtained for a particular set of columns, the concentration being measured by the difference of refractive index of polymer solutions as compared to the refractive index of pure solvent.

Then by passing through the columns a solution of an unknown sample of polymer of that particular type, and determining the concentration of polymer by differential refractive index in accordance with the counts or time transpired, it is possible to plot a molecular weight distribution curve. Differential refractive index is the difference between the refractive index for the solution from the GPC column and for the pure solvent respectively. By drawing a vertical line from the base at the point for a specific molecular weight, the area under the curve to the left of the line represents the amount of polymer having less than that specific molecular weight. By dividing that area by the total area under the curve it is possible to determine the fraction or percentage of polymer below a specified molecular weight.

In accordance with such determinations, it has been found that butadiene polymers having a molecular weight distribution such that 50% or more, preferably 90% or more, of the molecular weight above 10,000 and also having at least 95% of the polymer above a molecular weight of 2,000, give very fast cure rate and upon curing have the desirable properties described herein.

Butadiene polymers of appropriate molecular weight distribution can be prepared by using soluble lithium catalyst to effect the polymerization, such as butyl lithium. It is also possible by extraction separation methods, to prepare polymer having appropriate molecular weight distribution for the purpose of this invention.

While the DSV of the butadiene polymer is advantageously at least 0.19, it is generally preferable to work with polymers having a DSV of 0.2–0.4. It is advantageous to work with polymers having viscosities as high as can be tolerated in the various processing steps for mixing the peroxide and thereafter fabricating the product. Obviously, the more viscous polymers present greater difficulty in uniform distribution of the peroxide in the polymer. Also, such polymers have poor flow during molding.

The peroxide-cured products of this invention have relatively good color, are generally clear and colorless, and have excellent heat resistance. These products have excellent chemical resistance.

The curing temperature is advantageously at least 225° F. (107° C.), preferably about 300–350° F. (150–177° C.). Generally no advantage in the process or product is obtained by exceeding a temperature of 420° F. (215° C.).

Although butadiene homopolymers are preferred in the practice of this invention, butadiene copolymers can also be used where the comonomers impart desirable properties and do not detract from the polymer properties. The comonomers are preferably vinyl aryl or isopropenyl aryl compounds or derivatives thereof having alkyl, aralkyl, cycloalkyl or chlorine attached to the aromatic nucleus, and preferably having no more than 20 carbon atoms.

Typical of these aromatic comonomers are styrene, alpha-methyl styrene, vinyl toluene, isopropenyl toluene, ethyl styrene, p-cyclohexyl styrene, o-, m- and p-Cl-styrene, vinyl naphthalene, vinyl methyl naphthalene, vinyl butyl naphthalene, vinyl cyclohexyl naphthalene, isopropenyl naphthalene, isopropenyl isopropyl napthalene, 1-vinyl-4-chloronaphthalene, 1-isopropenyl-5-chloronaphthalene, vinyl diphenyl, vinyl diphenylethyl, 4-vinyl-4'-methyl diphenyl, 4-vinyl-4'-chlorodiphenyl and the like. Preferably such comonomers have no more than 12 carbon atoms. Where such comonomers are to be used, generally at least 1%, preferably at least 5% by weight should be used, and as much as 60%, preferably no more than 50% may be used.

The peroxides used are advantageously those having a reasonably fast rate of decomposition at the temperature being used. In some cases it is desirable to use a mixture of peroxides, one having a faster rate of decomposition as the temperature is raised gradually to the desired temperature range, and the other peroxide being slower to decompose in the lower temperature range, but reaching a high rate of decomposition later in the heating period.

The peroxides suitable for use in the practice of this invention can be represented by the formula

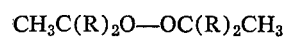

$$CH_3C(R)_2O-OC(R)_2CH_3$$

wherein R represents aryl or alkyl, including cycloalkyl, aralkyl, alkaryl, etc., of 1–20 carbon atoms. The respective R groups in the particular compounds can be similar or dissimilar.

Typical R groups include methyl, ethyl, propyl, butyl, hexyl, heptyl, decyl, dodecyl, octadecyl, phenyl, tolyl, xylyl, benzyl, phenethyl, naphthyl, methylnaphthyl, naphthylethyl, diphenyl, benzylphenyl, butylphenyl, cyclohexyl, cycloheptyl, cyclohexylmethyl, cycloheptylethyl, methylcycloheptyl, etc.

Typical peroxy compounds of the above formula which decompose to give the desired free radical, namely $$CH_3C(R)_2O$$

include various diperoxides and mixed peroxides. Specific illustrations of these include dicumyl peroxide, ditertiarybutyl peroxide, tertiarybutyl-cumyl peroxide, ditertiaryamyl peroxide, tertiarybutyl-tertiaryamyl peroxide, tertiaryamylcumyl peroxide, ditertiaryoctyl peroxide, bis(1,1-diphenyl-ethyl) peroxide, bis(1,1-dicyclohexyl-ethyl) peroxide, bis(1-cyclohexyl-1-methyl-ethyl) peroxide, bis(1-phenyl-1-ethyl-ethyl) peroxide, etc. The symmetrical peroxides which have identical groups on each side of the peroxy oxygen atoms are more easily available and therefore preferable. However, where mixed peroxides, that is peroxides having two different $CH_3C(R)_2O\cdot$ radicals, are available, these can be used very satisfactorily.

The peroxy catalyst is advantageously used in an amount equivalent to 0.5–8 parts by weight of dicumyl peroxide per 100 parts by weight of polymer. Since the molecular weights of the various peroxy compounds vary, the proportions required to give the same amount of peroxy groups or free radicals is determined by the equivalent weight. Therefore the proportions of peroxy compound required to effect the desired curing or rate of curing is defined as the amount equivalent to 0.5–8 parts by weight of dicumyl peroxide. Sometimes commercial peroxides are sold in diluted form such as Dicup 40''. These can be used, the amount used being calculated according to the actual peroxide content.

The optimum proportion of peroxide depends on the percentage of vinyl repeating units contained in the polymer, the higher vinyl content polymers requiring less catalyst within the indicated range, and the lower vinyl content polymers within the cited percentage range requiring more of the peroxy compound. Preferably 0.5–3 parts of dicumyl peroxide or equivalent amount of other peroxide compound is used for polymers having a vinyl repeating unit content of 90% or more.

The polymers used in this invention are defined by the specific limitations described above with respect to percent of pendent vinyl group repeating units, average molecular weight ($M_v$), percent by weight above 10,000 molecular weight, percent by weight above 2,000 molecular weight and dilute solution viscosity.

For such proposes the butadiene polymers likewise have at least 80% and preferably more than 90% of the butadiene repeating units having pendent vinyl groups, have a viscosity-measured average molecular weight between 14,000 and 34,000, have at least 50% and preferably at least 90% by weight of the polymer of a molecular weight greater than 10,000, and have at least 95% by weight of the polymer with a molecular weight greater than 2,000.

In various curing operations, either with or without filler, advantageous properties are obtained when at least 50%, and preferably at least 70% of the total unsaturation of the polymer is consumed or used up in the curing process. The amount of remaining unsaturation can be determined by infrared analysis.

The compounding of the oil and polymer, and any filler used can be performed in a Cone Vertical Mixer which imparts good mixing action. A Baker-Perkins Mixer is preferred for large batches, and a Bramley Mixer and other types of double arm mixers can also be used for this purpose. In some cases, particularly with relatively small amounts of filler, stirring by hand or with a laboratory propeller type stirrer may be adequate.

As a filler, silica is preferred. It has the advantage of a very low cost and very good physical properties for this purpose. Other materials particularly suitable as fillers include alumina, mica, feldspar, talc, asbestos, clay, powdered metal, such as aluminum, iron, brass, zinc and the like, carbon black, graphite, wood flour, cellulose fiber, etc. Glass fiber as such or in the form of glass cloth or glass mat is also considered as a suitable filler as described hereinafter. In most cases a coupling agent is desirable to give optimum properties. The coupling agent such as an organosilane compound, aids by forming a bond between the filler, such as silica, and the resin.

Various methods of practicing the invention are illustrated by the following examples. These examples are intended merely to illustrate the invention and not in any sense to limit the manner in which he invention can be practiced. The parts and percentages recited therein and all through the specification, unless specifically provided otherwise, are by weight.

EXAMPLE I

A series of three experiments are performed using identical conditions, except for the variations noted herein. A high-vinyl polybutadiene polymer is used having 91% vinyl content and a dilute solution viscosity of 0.24, with an average number molecular weight of 15,000 and a molecular weight distribution of 95% above 2,000 and 90% above 10,000. In each case 200 parts of resin are used with 4 parts of dicumyl peroxide and 0.4 part of inhibitor (stearyl beta - (p - hydroxy - m,m'-di-t-butylphenyl)-acetate). In one case 50 parts of a mineral oil (20% based on combined weight of polymer and oil) is added. The mineral oil is approximately 100% aliphatic and has a specific gravity at 60° F. of 0.845, a Saybolt viscosity (SUS) at 100° F. of 70, a pour point of 20° F. and color of 30+ Saybolt. In a second case 100 parts (33%) of the same mineral oil is added. And in a third case a control is run with no mineral oil. Using an initial heating temperature of 150° C., a peak temperature of 242° C. is reached in the two compositions containing mineral oil, and a peak temperature of 355° C. is obtained with the composition containing no mineral oil. Each of the compositions containing mineral oil is free of cracking, crazing and bubbles, whereas the control which has no mineral oil has numerous cracks therein. The product with 20% oil has a Shore A hardness of 75 and that with 33% was too soft to give a reading.

EXAMPLE II

The procedure of Example I is repeated a number of times in making pint castings of compositions containing in addition in each case 200 parts of t-butyl styrene. The compositions contained the same oil used in Example I in respective amounts of 20%, 10%, 5%, 1% and 0% (control). The percent mineral oil together with the peak temperatures and appearance of the castings are given in the table below.

| Percent oil | Peak temp., °C. | Defects | Hardness Shore A |
|---|---|---|---|
| 20 | 235 | None | 76 |
| 10 | 250 | ....do.... | 98 |
| 5 | 295 | Very minor cracking [1] | |
| 1 | 345 | ....do [1] | |
| 0 | 355 | Charred in center and very largely cracked. | |

[1] When repeated in smaller castings of 1'' thickness, the molded products having 5% and 1% oil are free of even minor cracking, whereas that without oil was still largely cracked.

EXAMPLE III

The procedure of Example I is repeated three times using 200 parts of the same polymer, 2000 parts t-butyl styrene, 0.8 parts of dicumyl peroxide, 0.4 part of antioxidant (as in Example I) and the following amounts of the same mineral oil used in Example I, namely 20%, 5% and 0%. The results obtained in pint castings are given in the table below.

TABLE II

| Percent oil | Peak temp., °C. | Defects |
| --- | --- | --- |
| 20 | 215 | No cracks, charring or bubbling. |
| 5 | 220 | Do. |
| 0 | 250 | Bubbles and cracks. |

EXAMPLE IV

The procedure of Example I is repeated using 200 parts of the same polybutadiene, 10 parts of the same mineral oil, 0.5 part of silane, 1 part of a blue pigment, 0.003 part of antifoaming agent and 115 parts of finely divided silica. A pint casting of this material gives no cracks, bubbles or crazing, whereas a control run without the oil gives severe cracking.

EXAMPLE V

The procedure of Example I is repeated using 300 parts of a polybutadiene having 95% vinyl content, a dilute solution viscosity of 0.16, an average number molecular weight of 9,000, and a molecular weight distribution of 95% over 2,000 and 90% over 10,000 molecular weight. With this is uniformly mixed 100 parts of t-butyl styrene, 67 parts of mineral oil, 12 parts of TiO$_2$ and 630 parts of SiO$_2$ plus one part of vinyl triacetoxysilane and 0.003 parts of an antifoaming agent together with 4 parts of dicumyl peroxide. This is placed in an oven maintained at 150° C. for one hour together with a similar one pint casting from a corresponding composition in which the oil has been omitted. The casting containing the oil is free of cracks, bubbles and crazing, and has a Rockwell F hardness of —12 uniform through the center and outside of the casting whereas the control has numerous cracks and bubbles.

EXAMPLE VI

The procedure of Example I is repeated using 180 parts of the same polybutadiene, 180 parts of t-butyl styrene, 3.6 parts of dicumyl peroxide and 40 parts of the mineral oil, together with 600 parts of finely divided silica and one part of silane coupling agent. Castings of 1 quart and 1 gallon sizes are made of this material and heated at 120° C. for one hour. In each case a peak temperature of 195° C. is achieved, and both castings are free of charring, bubbling and cracking. This indicates that the exotherm temperature is controllable regardless of size, since increasing from 1 quart to 1 gallon size produces no difference in the peak temperature.

EXAMPLE VII

The procedure of Example I is repeated a number of times with similar satisfactory results using individually in place of the oil of Example I the amounts respectively of the following oils:
(a) 10 parts of an oil having 49% aliphatic hydrocarbon, a specific gravity at 60° F. (15.6° C.) of 0.87 and a Saybolt viscosity at 100° F. (37.8° C.) of 335;
(b) 15 parts of an oil having 67% aliphatic hydrocarbon, a specific gravity at 60° F. of 0.88 and a Saybolt viscosity at 100° F. of 65;
(c) 20 parts of an oil having 70% aliphatic hydrocarbon, a specific gravity at 60° F. of 0.87 and a Saybolt viscosity at 100° F. of 45;
(d) 25 parts of an oil having 42% aliphatic hydrocarbon, a specific gravity at 60° F. of 0.87 and a Saybolt viscosity at 100° F. of 60.

In each case the casting is free of cracks, crazing and bubbles.

EXAMPLE VIII

The procedure of Example I is repeated a number of times with similar satisfactory results using individually in place of the polymer of Example I the following polymers:
(a) Polybutadiene of average number molecular weight of 24,000; vinyl content of 92; 95% above 2,000 molecular weight and 90% above 10,000 molecular weight;
(b) Butadiene-styrene (50–50) copolymer of 30,000 average number molecular weight; butadiene portion is 90% vinyl type repeating units; 95% is above 2,000 molecular weight and 90% is above 10,000 molecular weight;
(c) Butadiene-styrene (75–25) copolymer of 34,000 average number molecular weight; butadiene portion has 92% of vinyl type repeating units; and the copolymer has 95% of molecular weight over 2,000 and 90% of molecular weight over 10,000.

In each case the casting is free of cracks, crazing and bubbles.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:
1. In a process for curing a high-vinyl butadiene polymer having at least 40 percent by weight of butadiene therein selected from the class consisting of homopolymers and butadiene-styrene copolymers with the butadiene repeating units therein having at least 80 percent in the 1, 2 configuration and the polymer having an average number molecular weight of 12,500–50,000 and a molecular weight distribution of at least 95 percent over 2,000 and at least 50 percent over 10,000 by heating said polymer to a temperature of 105–205° C., at which curing temperature the polymer has a tendency to overheat from the exotherm to a temperature exceeding the desired temperature range and thereby causing crazing and cracking in the cured product, a peroxide having the formula

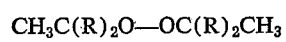

wherein R represents an aryl, alkyl, cycloalkyl, aralkyl, or alkaryl radical, the improvement whereby said exotherm is modulated and said crazing and cracking is avoided by the step of conducting said heating while said polymer is in intimate mixture with 1–30 percent by weight of a hydrocarbon oil, based on the combined weight of said polymer and oil, said oil having at least 50 percent by weight of aliphatic portion therein, the aliphatic portion representing at least 1 percent by weight of the combined weight of said polymer and oil, said oil having a specific gravity of 60° F. in the range of 0.83 to 0.89 and a viscosity in the range of 60 to 365 Saybolt University viscosity in seconds at 100° F.
2. The process of claim 1 in which said polymer is polybutadiene and said molecular weight is in the range of 14,000 to 34,000.
3. The process of claim 2 in which said polymer has a molecular weight distribution of at least 90 percent above 10,000.
4. The process of claim 3 in which said polymer has at least 90% of the butadiene repeating units in the 1,2-configuration.
5. The process of claim 4 in which the aliphatic portion of said oil represents at least 5 percent by weight of the combined weight of polymer and oil.
6. The process of claim 5 in which said polymer and oil mixture is heated for a period of approximately one hour.

7. The process of claim 1 in which said polymer is a butadiene-styrene copolymer having 5-60 percent by weight of styrene therein.

8. The process of claim 7 in which said copolymer has about 15-30 percent by weight of styrene therein.

9. The process of claim 8 in which the butadiene repeating units in said copolymer have at least 90 percent in the 1,2-configuration.

10. The process of claim 1 in which said oil has at least 80 percent aliphatic portion, a specific gravity of 0.835-0.85, and a Saybolt viscosity in seconds at 100° F. of 65-95.

11. The process of claim 10 in which said polymer is a polybutadiene.

12. The process of claim 11 in which said polybutadiene is at least 90 percent in the 1,2-configuration.

References Cited
UNITED STATES PATENTS

| | | | |
|---|---|---|---|
| 2,880,190 | 3/1959 | Gleason | 260—33.6 AQ |
| 3,083,175 | 3/1963 | Safford et al. | 200—41.5 R |
| 3,105,828 | 10/1963 | Porter | 260—83.7 |

MORRIS LIEBMAN, Primary Examiner

H. H. FLETCHER, Assistant Examiner

U.S. Cl. X.R.

260—83.7, 94.1 M, 94.7 A

PO-1050
(5/69)

UNITED STATES PATENT OFFICE
CERTIFICATE OF CORRECTION

Patent No. 3,766,124      Dated October 16, 1973

Inventor(s) Dale A. Tompkins

It is certified that error appears in the above-identified patent and that said Letters Patent are hereby corrected as shown below:

In Column 2, Line 41 "(SUS)" should be --SVS--.

In Column 2, Line 43 "pour-points" should be --pour-point--.

In Column 3, Line 47 "htan" should be --than--.

In Column 4, Line 54 "napthalene" should be --naphthalene--.

In Column 5, Line 14, the formula after "O" should be inserted a --period (.)-- in the middle of the line.

In Column 5, Line 57 "proposes" should be --purposes--.

In Column 6, Line 20, "he" should be --the--.

In Column 6, Line 75, "2000" should be --200--.

In Column 7, Line 26, "95%" should be --93%--.

In Column 7, Line 38, "Rockwell F" should be --Rockwell E--.

Signed and sealed this 7th day of January 1975.

(SEAL)
Attest:

McCOY M. GIBSON JR.
Attesting Officer

C. MARSHALL DANN
Commissioner of Patents